US009697426B2

(12) United States Patent
Baselau et al.

(10) Patent No.: US 9,697,426 B2
(45) Date of Patent: *Jul. 4, 2017

(54) EFFICIENT LOCATION REFERENCING METHOD

(75) Inventors: Sven Baselau, Berlin (DE); Lars Petzold, Berlin (DE); Axel Berndt, Berlin (DE)

(73) Assignee: TomTom Traffic B.V., Amsterdam (NL)

( * ) Notice: Subject to any disclaimer, the term of this patent is extended or adjusted under 35 U.S.C. 154(b) by 335 days.

This patent is subject to a terminal disclaimer.

(21) Appl. No.: 13/979,184

(22) PCT Filed: Jan. 11, 2012

(86) PCT No.: PCT/EP2012/050372
§ 371 (c)(1),
(2), (4) Date: Jul. 11, 2013

(87) PCT Pub. No.: WO2012/095456
PCT Pub. Date: Jul. 19, 2012

(65) Prior Publication Data
US 2013/0294702 A1 Nov. 7, 2013

(30) Foreign Application Priority Data

Jan. 11, 2011 (GB) .................................. 1100403.3
Aug. 26, 2011 (GB) .................................. 1114810.3

(51) Int. Cl.
*G01S 1/00* (2006.01)
*G06K 9/48* (2006.01)
(Continued)

(52) U.S. Cl.
CPC ......... *G06K 9/00651* (2013.01); *G01C 21/26* (2013.01); *G01C 21/3446* (2013.01); *G09B 29/106* (2013.01)

(58) Field of Classification Search
USPC .................................. 701/410, 533; 382/199
See application file for complete search history.

(56) References Cited

U.S. PATENT DOCUMENTS 6,751,549 B1 *  6/2004  Kozak .................. B61L 29/246
                                                   701/410
8,626,438 B2 *  1/2014  Petzold ............... G09B 29/106
                                                   701/408
(Continued)

FOREIGN PATENT DOCUMENTS

EP   1335315 A2   8/2003
EP   1637841 A    3/2006
(Continued)

OTHER PUBLICATIONS

International Search Report issued May 10, 2013 for International Application No. PCT/EP2012/050372.
(Continued)

*Primary Examiner* — Tyler Paige

(57) ABSTRACT

A method of encoding a continuous path within a road network is described, the path being completely represented within a digital map and expressible as a path list of lines and/or segments existing in said digital map and consecutively ordered, wherein said lines and/or segments have one or more attributes associated therewith. The method involves storing a start position in a route search list, and determining a path from the start node of the start position and including said start position to an end node of the last line or segment in the path list within said digital map. The path is determined according to an algorithm utilizing an attribute of said lines or segments. The attribute may be a lowest functional road class (LFRC) of the path to be encoded or a part thereof.

16 Claims, 14 Drawing Sheets

(51) Int. Cl.
*G01C 21/34* (2006.01)
*G06K 9/00* (2006.01)
*G01C 21/26* (2006.01)
*G09B 29/10* (2006.01)

(56) References Cited

U.S. PATENT DOCUMENTS

| | | |
|---|---|---|
| 2001/0029430 A1 | 10/2001 | Tamura |
| 2003/0223373 A1 | 12/2003 | Nakamura et al. |
| 2004/0039520 A1 | 2/2004 | Khavakh et al. |
| 2004/0117358 A1* | 6/2004 | von Kaenel ...... G06F 17/30241 |
| 2005/0149251 A1* | 7/2005 | Donath ................ G01C 21/26 701/532 |
| 2006/0058952 A1* | 3/2006 | Cooper ................ G01C 21/26 701/532 |
| 2007/0002040 A1* | 1/2007 | Oldroyd ................ G01C 11/00 345/419 |
| 2007/0038362 A1 | 2/2007 | Gueziec |
| 2007/0162465 A1* | 7/2007 | Cope ................ G06F 17/2247 |
| 2008/0114502 A1* | 5/2008 | Breed ................ B60C 11/24 701/2 |
| 2008/0172172 A1 | 7/2008 | Ng |
| 2009/0177678 A1* | 7/2009 | Clark ................ G06F 17/30241 |
| 2010/0088019 A1* | 4/2010 | Barcklay ................ G01C 21/30 701/533 |
| 2010/0286908 A1 | 11/2010 | Tate, Jr. et al. |
| 2011/0098912 A1* | 4/2011 | Baselau ................ G09B 29/106 701/532 |
| 2011/0112761 A1* | 5/2011 | Hurley ................ G01C 21/32 701/465 |
| 2011/0118971 A1* | 5/2011 | Petzold ................ G09B 29/106 701/532 |
| 2011/0257883 A1* | 10/2011 | Kuznetsov ......... G01C 21/3691 701/533 |
| 2011/0288762 A1* | 11/2011 | Kuznetsov ............ G01C 21/32 701/532 |
| 2013/0002649 A1* | 1/2013 | Wu ....................... G06T 19/006 345/419 |
| 2013/0030692 A1* | 1/2013 | Hagan ................ G01C 21/32 701/410 |
| 2013/0041574 A1* | 2/2013 | Koshizen ............ G08G 1/0112 701/118 |
| 2013/0088345 A1* | 4/2013 | Roesner .......... G06K 19/07758 340/438 |
| 2013/0294702 A1* | 11/2013 | Baselau ................ G01C 21/26 382/199 |

FOREIGN PATENT DOCUMENTS

| | | |
|---|---|---|
| EP | 2136183 A1 | 12/2009 |
| EP | 2037219 B1 | 12/2011 |
| GB | 2443472 A | 5/2008 |
| JP | 2003233768 A | 8/2003 |
| JP | 2003233768 A1 | 8/2003 |
| JP | 2007104543 A | 4/2007 |
| RU | 2153194 C1 | 7/2000 |
| RU | 2208765 C1 | 7/2003 |
| TW | 503324 B | 9/2002 |
| TW | 392135 B | 6/2006 |
| WO | 9854682 A1 | 12/1998 |
| WO | 02101331 A1 | 12/2002 |
| WO | 2008004857 A1 | 1/2008 |
| WO | 2010000706 A1 | 1/2010 |
| WO | 2010000707 A1 | 1/2010 |
| WO | 2010077223 A1 | 7/2010 |

OTHER PUBLICATIONS

OpenLR™ White paper version 1.0 An open standard for encoding, transmitting and decoding location references in digital maps Sep. 2009.

OpenLR™ White paper version 1.1 An open standard for encoding, transmitting and decoding location references in digital maps Dec. 11, 2009.

OpenLR™ White paper version 1.2 An open standard for encoding, transmitting and decoding location references in digital maps Feb. 1, 2010.

OpenLR™ White paper version 1.3 An open standard for encoding, transmitting and decoding location references in digital maps May 25, 2010.

* cited by examiner

OpenLR encoder, route search parametrized with LFRC of FRC 3

OpenLR decoder, route search parametrized with LFRC of FRC 5

OpenLR encoder, route search parametrized with LFRC of FRC 5

OpenLR decoder, route search parametrized with LFRC of FRC 5

EFFICIENT LOCATION REFERENCING METHOD

CROSS-REFERENCES TO RELATED APPLICATIONS

This application is the National Stage of International Application No. PCT/EP2012/050372 filed Jan. 11, 2012 and designating the United States. The application claims the priority of United Kingdom Patent Application No. 1100403.3 filed Jan. 11, 2011 and United Kingdom Patent Application No. 1114810.3 filed Aug. 26, 2011. The entire content of these applications is incorporated herein by reference.

FIELD OF THE INVENTION

The present invention is concerned with an efficient map-agnostic on-the-fly location referencing method. More particularly, the method is embodied in a location encoding method which, although involving as a prerequisite a digital map such as those produced and sold by companies such as TomTom International B. V. and Navteq Inc., is ultimately map-agnostic in that the particular version or type of digital map used is not fundamentally important to the resulting encoded description of the physical location.

In the interests of clarity, the term "location" as used hereinafter is to considered as encompassing a variety of different physical, real-world features such as a point location on the surface of the earth, a continuous path or route, or a contiguous chain of such, of navigable thoroughfares existing on earth, or an area or region on earth capable of being defined by two (in the case of a rectangular, square or circular area), or more parameters. More succinctly, a location is a simple or compound geographical object. However, this invention is most applicable to an efficient, machine-readable representation of a path through a network of roads or other navigable thoroughfares represented in a digital map.

BACKGROUND TO THE INVENTION

Geocoding is a known technique whereby a human referencing system for physical locations, such as a street address, country and/or postcode is converted into associated geographic coordinates, e.g. latitude and longitude. Various different geocoding systems currently exist and rely, at least to some extent, on a geographic information system (GIS) in which the street network is already mapped within the geographic coordinate space. Inverse geocoding is the reverse process.

Any modern digital map (or mathematical graph, as they are sometimes known) can be considered as a GIS, and in a most simple form is effectively a database consisting of a plurality of tables defining firstly nodes (which can be considered as points or zero-dimensional objects) most commonly representative of road intersections, and secondly lines between those nodes representing the roads between those intersections. In more detailed digital maps, lines may be divided into segments defined by a start node and end node, which may be the same in the case of a segment of zero length or a looped segment (in which case the segment has a non-zero length), but are more commonly separate. Nodes may be considered real or "valid" for the purposes of this application when they represent a road intersection at which a minimum of 3 lines or segments intersect, whereas "artificial" or "avoidable" nodes are those which are provided as anchors for segments not being defined at one or both ends by a real node. These artificial nodes are useful in digital maps to provide, among other things, shape information for a particular stretch of road.

In this manner, nodes, lines and segments can be used as a means of completely describing a road network, and each element in the database is further defined by various attributes which are again represented by data in the tables of the database, e.g. each node will typically have latitude and longitude attributes to define its real-world position. The complete "graph" of the road network is described by millions of nodes and segments to cover an area of spanning one or more countries, or part thereof.

Although practically all modern digital maps involve a structured definition of nodes and segments, the actual manner in which this is effected between digital map providers varies enormously. For instance, each map vendor (and possibly each map version) may use unique Ds for each map element, whether node or segment. Therefore, even simple geocoding and inverse geocoding is possible only with some knowledge of the underlying structure of the database in which the requisite digital map is embodied. More simply, a query designed to extract a street address from one digital map database based on latitude and longitude will not necessarily work on another—it may need re-casting as appropriate for the particular digital map database in question. This can also be true for different versions of a digital map provided by the same vendor.

To overcome the drawbacks associated with map-specific referencing, a map agnostic location referencing system has been developed by TomTom International B.V., which is referred to as OpenLR™. An example of encoding of a location using OpenLR™ is described in WO 2010/000707, while the associated decoding of a location encoded using OpenLR™ is described in WO 2010/000706. Further details of the OpenLR™ location referencing system can be found in the documents found at http://www.openlr.org.

The input to an OpenLR encoder is a route or path (also referred to as a "line location"—a connected path of line elements in a road network having exactly one start/end point) and a map database (e.g. MapA), which provides the road network the route is located in. The output is a map-independent line location reference. A "line location reference" as used herein means a set of information, typically map-independent, relating to a line location. On a receiving side an OpenLR decoder finds back the original route based on this line location reference and a map database (e.g. MapB) that covers the relevant road network. MapA and MapB do not need to refer to the same map database as long as they cover the same geographic area.

The manner by which a location is conventionally encoded using OpenLR™, i.e. as set out in WO 2010/000707, will now be described. The following description is provided in terms of segments, but it is to be understood that the method can be equally applied to lines, or to combinations of lines and segments, which together are representative of a continuous path through a road network.

Referring firstly to FIG. 1, and as previously mentioned, it is possible to store complete location references having previously been successfully encoded according to the present invention in a database, and therefore in FIG. 1 at step 10, a check is made of such database to establish whether the location desired to be encoded has already been encoded. If so, then the previously encoded location can be retrieved from the database, without any further processing.

If the location is not present in the database, then a validity check 14 is performed on the location and its constituent segments to determine whether the location meets certain criteria hereinafter described, and provided that the location is valid, the location reference is created at step 16. If either the validity check, or the creation of a location reference for that particular location fails, then such failure may also be stored in said database as indicated in step 18.

As final steps in the process, the location reference created at 16 is further checked for validity in step 20. Step 22 is illustrative in that it signifies conversion from one representation to another. Ultimately, the conversion process (which may include one or more intermediate formats) results in a wirelessly transmissible and machine readable binary representation as prescribed in a physical data format such as that hereinafter described. This format may take another form, such as XML or indeed any other mark-up or machine-readable representation useful in transferring information between an encoder and decoder, and the present invention is not to be considered limited to the specific format described. Thereafter, the complete, accurate and correct representation of the location can be stored in said database, as indicated in step 24.

Referring to FIG. 2, the "Check_Location" validity check process illustrated at 14 in FIG. 1 is further described. All locations which are not stored in the database of previously encoded locations need to be checked for validity before further processing. As a first step, at 30, a connectivity check is performed. The check of the connectivity ensures that the incoming location is not split up into two or more different stretches which are not connected. Each connected stretch needs to be handled separately and represents one location to be encoded in its own right. This check is passed if the location consists of only one connected stretch.

At step 32, a functional road class check is performed. This check ensures that all of the segments forming part of the initial location meet a minimum functional road class as defined in the underlying digital map. The functional road class (FRC) is a common attribute of lines or segments in map data and indicative of a relative importance of a particular type of road. An arbitrary decision to include only functional road classes from 0-7 has been made, as this effectively precludes any non-navigable roads, or roads of a very low category on which traffic events would be most unlikely ever to occur. The greater the FRC value, the relatively less important is the road. Within the range of functional road classes used herein an FRC of 0 indicates a functional road class of highest importance and an FRC of 7 a functional road class of lowest importance In one embodiment, the encoder can be enabled to check whether the location is affected by turn restrictions or not. If enabled, then the location will be investigated step by step, as indicated at 34, if there is a turn restriction along the way. Every turn from segment to segment needs to be valid. If not, an exception will be thrown at 39 and the location will not be encoded. It is worth mentioning here that the turn restriction check need not be enabled, and the method will continue to encode locations successfully for the vast majority of locations. However enabling a turn restriction check as described merely acts as an extra means of ensuring successful encoding.

As final steps to the validity check of the location, a determination is made as to whether the start node of the first segment in the location and the end node of the last segment in the location are real nodes, as opposed to being artificial or avoidable nodes. To explain further, segments in most instances tend to be artificial constructions and arbitrarily defined by the map vendor. Nevertheless they do provide much greater resolution compared to lines as regards describing traffic events on real-world sections of road where the traffic event begins at some arbitrary point along a particular road section. In the context of a motorway or major highway, a traffic event may occur at some point between two intersections (represented by real nodes) located a significant distance apart (e.g. 15 km or more), and therefore the exact point at which a traffic situation exists is much more likely to be close to an artificial node than it is to a real node. However, the probability of having such artificial nodes in the decoder map is very small, so these artificial nodes are to be avoided. This is done by extending the location uniquely at its start and end to real nodes appearing in the underlying digital map, and an offset distance value is provided as an attribute to such nodes so that the exact position of the traffic (or other) event, i.e. the correct start of the location to be encoded, can be correctly referenced. Therefore, the location can be described precisely by using a path which covers the location completely and offsets. Having a longer path covering the location also allows for the possibility of re-using the location reference path and merely updating the offsets, which will save bandwidth and time.

Accordingly, if the start node is not artificial then there will be no extension. Otherwise the incoming segment to the first segment having the artificial start node is chosen as the new start segment at step 36. If the start node of the new start segment is also artificial or avoidable then the procedure is repeated until a suitable start node is identified.

The second step 38 tries to extend the end of the location. This is done in much the same way as for the start segment except that the end node of the last segment is assessed, and a search made for outgoing road segments. If in either of these two steps, an artificial node cannot be extended and a real node found, then it is possible to continue with the method using the artificial node in the hope that it can be matched on the decoding side. Accordingly, the method is still valid, but the confidence level is lower.

Referring to FIG. 3, a description of the Create_LocationReference step 16 in FIG. 1 is provided. After the validity processing described above, a valid sequence of segments is provided, and this is desired to be converted into a location reference as a tree of objects defined in a logical data format, as hereinafter described.

The first step 40 in the generation of a location reference according to the present invention is to identify the first segment at which the route search should commence.

Thereafter, a route search is performed at step 42 using either the first segment or an intermediate or deviation segment. The route search is a shortest path route calculation between the first (or intermediate) segment and last segment of the location. The specifics of route search are described in greater detail with reference to FIG. 4.

The route search calculates a shortest path between the start segment and the destination segment. This calculation is done iteratively, and after an initialization at step 50, the main loop including steps 52, 54, 56, 58 will calculate a shortest path. The shortest route path will be checked every iteration at step 56 (described in greater detail hereinafter with reference to FIG. 5) to establish whether the location is still part of the calculated shortest-path tree or not. If the location is not covered by the shortest-path tree anymore then the route calculation stops and returns a partial route (the part of the location which is covered so far) at step 60 and a segment which shall be used as intermediate location reference point to make the route search unique, and capable of being continued thereafter. This intermediate segment is identified at step 44 in FIG. 3 and returned to the route search algorithm as the new start segment from which one or more further route searches are to be conducted.

Ideally the route search will focus on the part of the location which is not extended as described above as the extended parts of the location will not have any influence on the route calculation because there is no deviation from this path possible. The extensions may be added to the location reference in a later step.

At step 50, the route search is initialized and all data structures are reset. At step 52, and decision point 53, a check is made as to whether the route search must be continued or can be stopped. The search can be stopped if:

the shortest-path between the start segment and destination segment is found, in which case a shortest path route can be generated as indicated at 62, there are no more segments to process which means that there exists no route between the start segment and destination segment, as indicated at 64, or if an intermediate segment is identified.

In all practical cases, a route should always exist because the path itself is valid and forms such a route but this check is compulsory for every route search algorithm. In the case that the search is not complete, at step 54, the Get Next Line procedure fetches the best line from what is often called an "open-list" being a list of all those lines forming part of the shortest path between two relevant nodes. As a consequence of the shortest path algorithm, the shortest path to a line is finalised with the departure of a line forming part of the location from one being present in the open-list as retrieved at step 54. Accordingly, The "Check_Location_Coverage" step 56 is outlined in greater detail with reference to FIG. 5, but briefly this step checks if this condition is fulfilled during the route calculation. Checking during the route calculation means that every fixed segment (a segment is fixed if the shortest path thereto has been finally determined) will be investigated if it also forms part of the location. If the segment currently under consideration forms part of the location desired to be referenced, then a check is made to establish that the beginning part of the location is completely included in the current shortest-path tree. This means that the calculated shortest path to the last location segment needs to be the location itself. If any deviation is encountered, the route calculation is stopped and a partial route is generated at step 60 and returned to the route search process illustrated in FIG. 3. In step 44 of this figure, an intermediate segment is identified in the underlying digital map, and route search is re-started using this intermediate segment as the start point.

There are various different possibilities for correctly identifying and referencing the intermediate segment depending on the nature of the deviation which appears in the shortest path calculation, and these are all described with reference to FIGS. 5, 6, 7, and 8.

To check coincidence of the shortest path thus far determined, the last segment found on the location during the route search is stored in a route search list (indicated at 70 in FIG. 5) so that it can easily be determined which segment should come next, as only subsequent segments contiguous with the last stored segment, or at least having coinciding end and start nodes respectively, can be considered. It is fundamental to the economy of location reference length that the shortest path route search effectively eliminates those segments from the reference which fall on the shortest path, i.e. there is no need for them to form part of the reference. Accordingly, at decision points 72, 74, checks are made that the most recent segment forming part of a shortest path route list both exists or coincides with the location being encoded, and is correctly referenced as far as the shortest path is concerned in terms of pointers which are ideally used in the shortest path list to refer to:

the next expected segment on the shortest path, and the previous segment on said shortest path.

Provided that both these pointers reference segments which are also on the location path, then the location is considered precisely covered by the shortest path and the route search can continue.

Of course however, shorter deviations will inevitably be found, and all possible deviation types are covered by the various branches of the flowchart of FIG. 5, and the simple line drawings of FIGS. 6, 7, and 8. Most simply, a deviation is found if a segment on the location path is currently being analysed but this segment is at odds with the next expected segment as far as the shortest route list is concerned. A deviation is also found if the next expected segment of the shortest route list is in conformity with the next segment in the location path list, but the predecessor pointer for this segment in the shortest path list does not point to the location. This means that the predecessor pointer needs to be equal to the last segment found on location. In both cases it is necessary to identify a proper intermediate. The following steps determine this intermediate and in a special case it is necessary to add two intermediates. The main focus on finding a proper intermediate is that we use a segment having a start node being part of an intersection.

Referring firstly to FIGS. 5 and 6, it is in all cases necessary to find the start of the deviation, indicated at 76. FIG. 6 illustrates the simplest case in which the deviation starts before the last segment stored as part of part of the shortest route list and also forming part of the original location path list. The total location path to be described is represented by segments A, B, C, D, E, F and G. The shortest path thus far determined with certainty and coinciding with the location is represented by the segments A and D, emboldened in the Figure. As the shortest path search progresses, particularly as between the start segment A and the end node of segment E, a deviation H is found which is shorter. In such a case (which will be the most common case), ideally it is desired to find the segment appearing on the location and having a start node at which the deviation starts. In this case, segment C is required to be included as the proper intermediate as this ensures that the location is followed in any shortest path algorithm conducted in a decoding process. This search effectively recurses through the location path list for segments that meet this criteria, and this is referenced at 78, 79 in FIG. 5. Although not possible in terms of the simple path shown in FIG. 6, it is possible that no such segment may be found. In this case, the segment last stored in the shortest route list can be used as the intermediate, as illustrated at 80 as a shortest path function using the last stored segment as its start will never identify any deviation originating before it.

In an alternative embodiment, the deviation originates after the end of the last segment stored in the route search list E, as emboldened in FIG. 7. In this case the shortest path from A to E is known, and only segments between A and E have been stored. The shortest path between segment A and the end node of segment F can actually be referenced by only A and I, the latter being a deviation from the location path which includes F and occurring after the end of the last stored segment E. In this case, the intermediate can be created from that segment F, as indicated at 82 in FIG. 5, provided that the predecessor pointer for segment F actually points back to a segment on the location, in this case E. This check is indicated at 84.

In the exceptional case in FIG. 8, where the predecessor pointer for a deviation occurring after the last segment stored as part of the shortest route search actually refers back to a segment not forming part of the location, as in the case of the segment K referring back to segment J, then as a first step, a first intermediate segment E is created (as in 82 previously discussed), and a second intermediate segment D is also stored as this is the last segment occurring on the location path and beginning with an intersection from which the shorter path segment J originated. These steps are indicated generally at 86, 88 in FIG. 5, and are necessary because the stored location reference must ultimately avoid both segments J and K.

Referring finally back to FIG. 3, once the processing of the entire location path list is complete, then all the partial shortest paths identified are combined at step 46. The coverage of the location may consist of several calculated partial routes if the initial route calculation determines an intermediate segment. This intermediate segment acts as additional information in the location reference in order to guide the route search for a complete coverage of the location. If the route search reaches the end of the location all calculated partial routes will be combined to form a path which covers the location completely. This step may in one embodiment also add the expansions at the start and the end of the location as calculated in steps 36, 38 illustrated in FIG. 2. The first and last location reference points will be adjusted and new offsets describing the relative position of the original location are calculated.

To provide a better understanding of the manner in which a location is encoded in accordance with the present invention, a further specific example is provided with reference to FIGS. 9, 10, 11 and 12.

An encoder map is shown in FIG. 9 and consists of 15 nodes and 23 lines (two-way lines are counted twice). The nodes are numbered from 1 to 15. The necessary line attributes are shown beside every line using the format: <FRC>, <FOW>, <Length in meter>. FRC is an abbreviation for "Functional Road Class" and FOW is an abbreviation for "Form of Way", both of which are described in greater detail below. The arrowheads indicate the possible driving direction for each line.

The location to be encoded is shown in FIG. 10 using bold lines. The location starts at node (3) and continues over the nodes (5), (7), (10), (11), (13), (14) and ends at node (15). Its total length in the encoder map is 685 meters. The ordered list of lines and the map to be used during encoding serves as input for the encoder.

Encoding:

In the first step of the encoding process the location will first be checked for validity. Since the location is connected and drivable and all functional road classes along the location are between 0 and 7, this location is valid. Turn restrictions are not included in the map data and therefore the encoder can ignore this check.

The encoder second step is to check the start and end node of the location as being real nodes according to certain predetermined data format rules. The end node (15) has only one incoming line and is therefore valid. The start node (3) also has two incident lines but here it is one outgoing and one incoming line. Therefore this node is not valid and the encoder searches for a real node outside the location. The encoder will find node (1) to be a real node and it also expands the location uniquely. Node (1) is chosen as the new start node for the location reference and there will be a positive offset of 150 meters. The total length of the location reference path results in 835 meters.

The third step of encoder is to proceed to calculate a shortest-path between the start line (in this case, the line between nodes (1) and (3); however, in common usage, the shortest path may be calculated without extensions) and the end line (line between nodes (14) and (15)) of the location. The resulting shortest-path is outlined in FIG. 11 using bold lines. The shortest-path has a length of 725 meters.

The next (fourth) step of the encoding process is now to check whether the location is covered by the calculated shortest-path. It will determine that this is not the case and there is a deviation after node (10).

According to the principles outlined above, the encoder will determine the line from node (10) to (11) as becoming a new intermediate location reference point. Node (10) is a real node since it cannot be stepped over during route search and the shortest-path to this line covers the corresponding part of the location completely. The length of the location being covered after this first shortest-path calculation is 561 meters.

The next encoding step prepares the route calculation in order to determine a shortest-path for the remaining part of the location (from node (10) over (11), (13) and (14) to (15)). The shortest-path calculation will therefore start at the line from (10) to (11) and ends at the line from (14) to (15).

The encoder returns to step 3 above and will determine a shortest path (length: 274 meters) between (10) and (15) and step 4 above will return that the location is now completely covered by the calculated shortest paths.

As a next step, the location reference path will be composed of the two shortest-paths and the ordered list of location reference points will now be formed. FIG. 12 shows the lines in bold which are selected for the location reference points. The first location reference point points to the line from node (1) to (3) and indicates the start of the location reference path, the second location reference point points to the line from node (10) to (11) and this line was necessary to avoid the deviation from the location. The last location reference point points to the line from node (14) to (15) and indicates the end of the location reference path.

The penultimate step is a check of the validity of the location reference. Since all lengths between two subsequent location reference points are less than the maximum distance, the location reference is confirmed as being valid.

The final step is the conversion of the ordered list of LRPs into a binary location reference.

It will therefore be appreciated from the above that the encoding process (and also the decoding process) is based on route search algorithms which investigate the lines stored in map databases. Typically a goal-directed unidirectional search, such as A*, is used to determine the shortest path coverage of a line location. While the number of lines that need to be investigated is already reduced through the use of e.g. A* algorithm, it would be desirable to further enhance the encoding method as described above.

SUMMARY OF THE INVENTION

In accordance with a first aspect of the present invention, there is provided a method of encoding a continuous path within a road network, said path being completely represented within a digital map and expressible as a path list of lines and/or segments existing in said digital map and consecutively ordered, wherein said lines and/or segments have one or more attributes associated therewith, said method comprising the steps of:

storing a start position in a route search list;

determining a path from the start position to an end position as indicated by the last line or segment in the path list within said digital map, said path being determined according to an algorithm utilising an attribute of said lines or segments; and encoding the continuous path using the determined path.

In accordance with the invention in this, and any other aspects, the continuous path (or line location) to be encoded may be referred to herein as the "actual path" or the "actual line location". The continuous path may interchangeably be referred to as a line location. The step of determining a path from the start position to an end position as indicated by the last line or segment in the path list within said digital map, said path being determined according to an algorithm utilising an attribute of said lines or segments, will be referred to herein as "the path determining step". The path determining step may also be referred to as a route searching step.

The method may comprise determining a path from a start node of the start position and including the start position to an end node of the last line or segment in the path list within the digital map.

In some preferred embodiments the step of determining a path from the start position to an end position as indicated by the last line or segment in the path list within the digital map comprises determining a shortest path from the start position to the end position.

In accordance with the invention the algorithm used in the determination of the path from the start position to the end position is preferably a shortest path algorithm. Thus the step of determining a path from the start position to the end position preferably comprises determining a shortest path from the start position to the end position. Such shortest path algorithms may include Dijkstra's algorithm or A*. Other algorithms might also be employed, provided they are reversible in that a path can be decoded using the corresponding reverse algorithm.

In accordance with preferred embodiments of the invention, the encoding of the path or line location involves finding a shortest path coverage of the path or line location in the digital map. The method may involve determining one or more shortest paths.

In accordance with the invention, the continuous path that is encoded is expressible as a path list of lines and/or segments existing in a digital map. In other words, the continuous path may be represented as a line location. The algorithm utilises or takes into account an attribute of the lines or segments making up the path or a line location formed by the lines or segments in the step of determining a path from the start position to the end position, e.g. from the start node of the start position to the end node of the last line or segment in the path list within the digital map.

It has been found that by taking into account an attribute of the lines or segments in the path determining step, the amount of processing which needs to be carried out to encode a path in accordance with the invention may be reduced. This is because the attribute may be used to reduce the number of lines or segments in the digital map which need to be investigated when calculating the or each shortest path. In preferred embodiments the algorithm uses the attribute of the lines or segments as a parameter in the path determination or route search step.

Various examples of the way in which this may be achieved will be described below. In general terms, the attribute may be used to identify certain lines or segments which are to be included and/or excluded in or from the path determination. For example, certain lines or segments may be excluded, i.e. not taken into consideration if their presence would not result in the determined path or the constituent lines or segments thereof meeting an attribute known to be associated with at least a part of the actual path or the lines or segments thereof. In this way, the rate at which paths may be encoded may be increased, and the invention may be implemented more efficiently even using hardware with more limited processing resources, such as portable navigation devices (PNDs). The present invention may therefore increase the applicability and efficiency of the encoding methods described in WO 2010/000707. For example, this may enhance and facilitate applicability of the methods to the provision of services such as traffic services, or the encoding of long routes.

In some embodiments the method comprises using the attribute to provide a threshold, and comparing an attribute of a line or segment to the threshold to determine whether to consider the line or segment in the path determining step. In some embodiments the method may be such that no line or segment having an attribute one of above or below the threshold is considered in the path determining step. The attribute may be taken as the threshold. The attribute of the line or segment that is compared to the threshold to determine whether to consider the line or segment in the path determining step may be the same as or a related attribute to the attribute used to provide the threshold.

In accordance with the invention in any of its embodiments, the algorithm, e.g. the shortest path algorithm uses an attribute of the lines or segments making up the continuous path to be encoded in the route search. The attribute may be used directly or indirectly as a parameter in the route search. The term "attribute" as used herein takes its customary meaning in the art. It will be understood that lines or segments in a digital map database are associated with one or more attributes representative of properties of the lines or segments. Common attributes include, for example, length of the line or segment, direction, form of way (FOVV), and functional road class (FRC).

In some embodiments only one attribute of the lines or segments is used in the path determination. However, it will be appreciated that a plurality of different attributes of the lines or segments may be used. References to "the" attribute may then be understood to refer to "the" or "an" attribute.

Any attribute suitable for use in the path determination step of the present invention may be used. The attribute is ideally an attribute which is commonly associated with lines or segments to maximise the possibility of its being associated with each of the lines or segments in the digital map. The attribute may also then be more likely to also be found in a receiver side map database to facilitate decoding.

The attribute may be an attribute associated with the one or more individual lines or segments making up the path. The attribute may therefore be representative of the properties of the individual lines or segments. In other embodiments the attribute may be an attribute associated with a set of the lines or segments forming a line location. The attribute may be representative of the properties of the set of lines and/or segments.

In some embodiments the attribute is a functional road class (FRC) of the lines or segments. The "functional road class" (or FRC) is an attribute of a line or segment in the road network that defines the importance of the road in the network. Any number of FRC values can be defined, but preferably 8 FRC values are used: FRC 0 to FRC 7. FRC 0 indicates the functional road class with the highest importance, e.g. main roads, motorways, etc, while FRC 7 indicates the functional road class with the lowest importance. In other words, the FRC attribute creates a hierarchy of lines allowing a line or segment with high importance to be distinguished from a line or segment of low importance. The step of the algorithm using the FRC attribute in the path determination may involve the algorithm using an actual FRC value or values or an FRC based value. A reference to an FRC value herein may refer to an actual FRC value or an FRC based value. For example, an FRC based value might be a softened FRC value, or a value derived from the FRC values such as an LFRC value as described below.

It is believed that the use of the functional road class of a line or segment representing a road in a digital map when determining the shortest path from a start position to an end position may be new and advantageous in its own right, e.g. in situations other than the location referencing methods set out above.

Thus, according to another aspect of the present invention, there is provided a method of determining the shortest path from a start position to an end position within a road network, said path being completely represented within a digital map and expressible as a path list of lines and/or segments existing in said digital map, wherein said lines and/or segments have a functional class associated therewith, and said shortest path is determined according to an algorithm utilising the functional road class of the lines and/or segments.

The present invention in this further aspect may include any or all of the features described in relation to the other aspects of the invention. For example, the path determination may be carried out in any of the manners described in relation to the other aspects of the invention.

It will be appreciated that the features described below and above are applicable to the methods in accordance with the invention in any of its aspects or embodiments, and thus "the method" referred to may be the method of any of the aspects of the invention.

In accordance with the invention in any of its aspects or embodiments, in a preferred embodiment the attribute used by the algorithm comprises a lowest functional road class (LFRC) for a line location. The line location may correspond to the entire path (or line location) to be encoded or to a part thereof.

The LFRC is the lowest functional road class of a line or segment included in the line location. The LFRC for a line location is an attribute which may be determined using the FRC attributes of the lines or segments making up the line location. In these embodiments, the method may comprise determining an LFRC for a line location.

The path determining step may be used to obtain a shortest path between the start position and an end position which may be compared to the path list for identity.

In preferred embodiments of the invention at least, the method involves covering the path (or line location) to be encoded with one or more determined shortest paths e.g. with each such shortest path covering a certain part of the path (or line location).

In some embodiments the method further comprises comparing the shortest path determined in the path determining step to the path list for identity, and in the absence of identity, identifying at least one deviation line or segment being part of the path list and having a start node representative of an intersection in said digital map but not being the line or segment first appearing in said path list, and if such deviation line or segment does not terminate at the end node of the last line or segment appearing in the path list, repeating the step of storing a start position in a route search list using said deviation line or segment, and storing the last line or segment in the path list in said route search list if not already stored.

It will be appreciated that the method comprises storing a start position in a route search list. In some embodiments the start position is the line or segment first appearing in said path list or, where the start node of said first line or segment is artificial, the first line or segment appearing in said digital map having a real start node and which leads directly to said first line or segment optionally through other artificial nodes. Alternatively, the start position may be a most recently identified deviation line or segment also appearing in said path list. Thus, in some preferred embodiments the start position is one of:
the line or segment first appearing in said path list or, where the start node of said first line or segment is artificial, the first line or segment appearing in said digital map having a real start node and which leads directly to said first line or segment optionally through other artificial nodes,
a most recently identified deviation line or segment also appearing in said path list.

In these preferred embodiments, one or more shortest paths are determined depending whether a path is determined only between a start position corresponding to the line or segment first appearing in the path list or a line or segment having a real start node and leading directly to the first line or segment where the start node of the first line or segment is artificial and an end node, or alternatively involves calculating one or more paths between an identified deviation line or segment appearing in the path list and the end node.

In accordance with a further aspect of the invention there is provided a method of encoding a continuous path within a road network, said path being completely represented within a digital map and expressible as a path list of lines and/or segments existing in said digital map and consecutively ordered, wherein said lines and/or segments have one or more attributes associated therewith, said method comprising the steps of:
(i) storing a start position in a route search list, said start position being one of:
the line or segment first appearing in said path list or, where the start node of said first line or segment is artificial, the first line or segment appearing in said digital map having a real start node and which leads directly to said first line or segment optionally through other artificial nodes,
a most recently identified deviation line or segment also appearing in said path list,
(ii) determining a path from the start node of the start position and including said start position to an end node of the last line or segment in the path list within said digital map, said path being determined according to an algorithm utilising an attribute of said lines or segments,
(iii) comparing the shortest path so determined to the path list for identity, and in the absence of identity, identifying at least one deviation line or segment being part of the path list and having a start node representative of an intersection in said digital map but not being the line or segment first appearing in said path list, and if such deviation line or segment does not terminate at the end node of the last line or segment appearing in the path list, repeating step (i) using said deviation line or segment, and
(iv) storing the last line or segment in the path list in said route search list if not already stored.

The present invention in accordance with this further aspect may include any or all of the features described in relation to the first and any other aspects of the invention to the extent that they are not mutually exclusive. Thus, for example, step (ii) may include any or all of the features described in relation to the path determining step of the first aspect of the invention. The algorithm may be a shortest path algorithm.

The features described below and above are applicable to the invention in any of its aspects.

In accordance with preferred embodiments of the invention in any of its aspects, for a or each shortest path that is determined, an associated LFRC value is calculated. Any method can be used to determine the LFRC value as desired, such as one or more of the techniques described below. The LFRC value is a value that the shortest path once determined should satisfy.

The LFRC values are preferably used in the route search or path determining step of the invention in accordance with any of its aspects or embodiments such that no line with a lower FRC value than the (current) LFRC value is considered, e.g. for inclusion in the determined path.

The current LFRC value is the value associated with, i.e. applicable to, the path being determined. The current LFRC value may be an LFRC value for the entire line location to be encoded or a part thereof that the shortest path being determined is intended to cover as discussed below. The LFRC value may then be an LFRC value for a remaining part of the path or line location to be encoded not yet covered by a shortest path. By definition of the LFRC calculation, no line in the corresponding part of the path or line location to be encoded has a lower FRC value than the current LFRC value. For example, if the LFRC for a part of the path being determined is 3, then the path determining step need not consider any lines or segments with a lower FRC value as these cannot form part of the required shortest path. In some embodiments the LFRC value is an LFRC value for the path between the start point corresponding to the start node or a real start node leading thereto or a deviation line or segment and the end node.

The LFRC value applied when determining any part of the path (or line location), i.e. any one of the shortest routes that, in preferred embodiments at least, combine to describe the line location, could be set as the LFRC of the entire path or line location i.e. the entire path or line location to be encoded. As will be appreciated, this LFRC value only needs to be calculated once, e.g. before the first route search is performed by iterating over the entire line location. In some embodiments, the method comprises determining an LFRC value for the entire line location to be encoded and using the LFRC value so determined in the or each shortest path determining step. By definition, no line or segment in any of the shortest paths to be calculated will have an FRC lower than the LFRC for the entire line location or path.

Alternatively, instead of always using the LFRC value for the entire line location to be encoded, a separate LFRC value can be determined for a portion of the path. The method may comprise determining a separate LFRC value for each portion of the path to be encoded in respect of which a shortest path is calculated. The LFRC value will be the value for a line location corresponding to a portion of the path to be encoded that the shortest path is intended to cover. For example, in a preferred embodiment, a LFRC value is determined for the remaining portion of the line location to be encoded. Thus, in some embodiments, when a deviation line or segment is identified and an associated shortest path determined, preferably a LFRC value for the remaining portion of the path is determined. This LFRC value will therefore be equal to or less than the LFRC value for the entire line location, i.e. the remaining portion or portions will have lines of higher or equal importance. The LFRC value can be determined using any suitable method as desired, for example: by iterating over the entire remaining part of the line location before the first route search is performed; by building and using an interval tree; and/or by creating and filling a suitable array.

The step of the algorithm using an attribute comprising an LFRC of the line location referred to herein may involve using the actual LFRC value or an LFRC based value for the line location. It will be appreciated that rather than using the actual calculated LFRC value for the line location or a portion thereof, an LFRC based value may be determined. Any reference herein to "LFRC" may refer to an actual LFRC value or an LFRC based value unless the context demands otherwise.

In some embodiments, the LFRC value is a "softened" LFRC value, and the softened value is used as the parameter in the route search. A softened LFRC value is a less important LFRC value than the calculated actual LFRC value. The degree to which a softened LFRC value is less important than an actual LFRC value can be chosen as desired, e.g. and can be dependent on the actual LFRC value.

The use of a softened LFRC value may be advantageous in some situations as described below. For example, the use of such values may lead to encoding of the path in a manner which increases the accuracy with which the path may subsequently be decoded in a second digital map as described below.

In preferred embodiments the LFRC value is an actual LFRC value or a softened LFRC value. The actual LFRC value is obtained by determining the lowest functional road class for the line location in question.

It will therefore be understood that the use of the attribute, e.g. FRC, and preferably the lowest FRC (LFRC) for a line location, as a parameter in the route search by the encoder allows the number of lines which need to be investigated to be reduced, thereby reducing the computation time and memory consumption for encoding line locations. Accordingly, the rate at which line locations can be encoded can be increased with the invention, thereby enhancing services, such as traffic services, and the encoding of long routes. Moreover, the invention allows the location referencing method to be more efficiently implemented on hardware with limited processing resources, such as portable navigation devices (PNDs).

Preferably, in embodiments including a step of comparing the shortest path determined to a path list for identity, or in accordance with step (iii) of the further aspect of the invention as described above, if the deviation line or segment terminates at the end node of the last line or segment appearing in the path list, and the predecessor of the last line or segment in the shortest path does not coincide with the penultimate line or segment appearing in said path list, then a second deviation line or segment is exceptionally identified being that line or segment emanating from the last node appearing in the path list which coincides with an intersection.

The methods of the present invention in accordance with any of its aspects or embodiments preferably include at least one of the following further steps: concatenation, conversion, transposition, and validity checking, which result in a valid, ordered list of location reference points, or a machine-readable representation thereof.

The methods can additionally or alternatively include a preliminary step of analysing the continuous path to be encoded for validity. The validity check may comprise analysing each item, e.g. line or segment in the path list representing the continuous path for validity. In the event that the path list is not valid in a given respect the method may comprise raising an exception.

In some embodiments a validity check can include a check to establish whether either or both of a start node of the first mentioned line or segment in the path list and an end node of the last mentioned in said path list coincide with a real node in the digital map. In the absence of such coincidence, the preliminary validity check may include identifying suitable real nodes and extending the continuous path accordingly by including additional lines or segments in the path list, and storing an offset representative of the distance between the real nodes and artificial nodes.

Alternatively or additionally the preliminary validity check may comprise a connectivity check to determine whether the path to be encoded consists of only one connected stretch. Each connected stretch needs to be handled separately and represents one location to be encoded in its own right.

Alternatively or additionally a preliminary validity check may comprise a functional road class check. The check may comprise determining whether all of the lines or segments forming part of the path to be encoded meet a minimum functional road class. The FRC may be as defined in the underlying digital map.

Alternatively or additionally the method may comprise determining whether the path to be encoded is affected by turn restrictions, and if so, whether each turn from a line or segment to a line or segment is valid. The validity of a turn may be assessed by reference to the digital map. The method can include the further step of determining whether a turn restriction check option is enabled, and if so enabled, assessing the location desired to be encoded for turn restrictions identified in the digital map and which may prejudice or compromise said location or make it impossible to navigate, and if such are identified, returning an error.

The method of the present invention can further include a step of imposing a restriction on the maximum distance between successive location reference points. The maximum distance can be 15 km.

The method can further include a step of converting the resulting route search list into a machine-readable format e.g. represented in binary or a markup language such as XML.

In another aspect of the invention, there is provided a system for encoding a continuous path or location comprising an encoder operating as described in accordance with any of the methods as set out above and in accordance with any of the aspects or embodiments of the invention. The encoder may comprise a database for storing pre-encoded locations or paths and the results of previous attempts at encoding those locations or paths. The system, on receiving a location or path to be encoded, first queries the database to establish whether that location or path or a part of it, forms a part of or is identical to a location or path having been previously stored within said database, said system returning either the previously encoded location or path or a part of it in the case of encoding having already been effected, or alternatively passing the continuous path or path location to the encoder, the output of which is in any event stored in said database together with that continuous path or location.

The encoding of a continuous path is thus further enhanced by storing each continuous path which is successfully encoded in a database, and for each subsequent continuous path desired to be encoded, querying said database to establish whether that subsequent continuous path, or a portion thereof, has been previously encoded. Additionally, if that subsequent continuous path forms part of a larger, previously encoded continuous path, then further efficiencies may be realised in the encoding process by use of said database. Furthermore, it may also be possible to store continuous paths in said database for which encoding failed, and for the encoding process to be halted well in advance of attempting to encode subsequent continuous paths being identical to or forming part of such continuous paths.

In another aspect of the invention, there is provided a system for determining a path, optionally a shortest path, from a start position to an end position within a road network comprising a processing resource or resources operating as described in accordance with the method as set out above in accordance with any of the aspects or embodiments of the invention.

The methods in accordance with the present invention in any of its aspects or embodiments may be implemented at least partially using software, e.g. computer programs. The present invention thus also extends to a computer program comprising computer readable instructions executable to perform a method according to any of the aspects or embodiments of the invention.

The invention thus also extends to a computer software carrier comprising software which when used to operate a system or apparatus comprising data processing means causes, in conjunction with said data processing means, said apparatus or system to carry out the steps of a method in accordance with any of the aspects or embodiments of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

In some preferred embodiments, the present invention extends to a navigation device comprising the system in accordance with any of the aspects or embodiments of the invention. The navigation device may be a portable navigation device (PND) or an integrated e.g. in vehicle navigation device. The navigation device may be provided by means of an application of a processing device which does not form part of a specific navigation device. For example the invention may be implemented using a suitable computer system arranged to execute navigation software. The system may be a mobile or portable computer system e.g. a mobile telephone or laptop, or may be a desktop system.

Where not explicitly stated, it will be appreciated that the invention in any of its aspects may include any or all of the features described in respect of other aspects or embodiments of the invention to the extent that they are not mutually exclusive. In particular, while various embodiments of operations have been described which may be performed in the method and by systems or apparatus, it will be appreciated that any one or more or all of these operations may be performed in the method and by the system or apparatus, in any combination, as desired, and as appropriate.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 9 illustrates an example network, FIG. 10 illustrates a location path desired to be encoded within that network, FIG. 11 illustrates the shortest path between start and end nodes of an extended path including that location, and FIG. 12 illustrates the location reference points required to completely reference that location;

DETAILED DESCRIPTION

Figure 1:
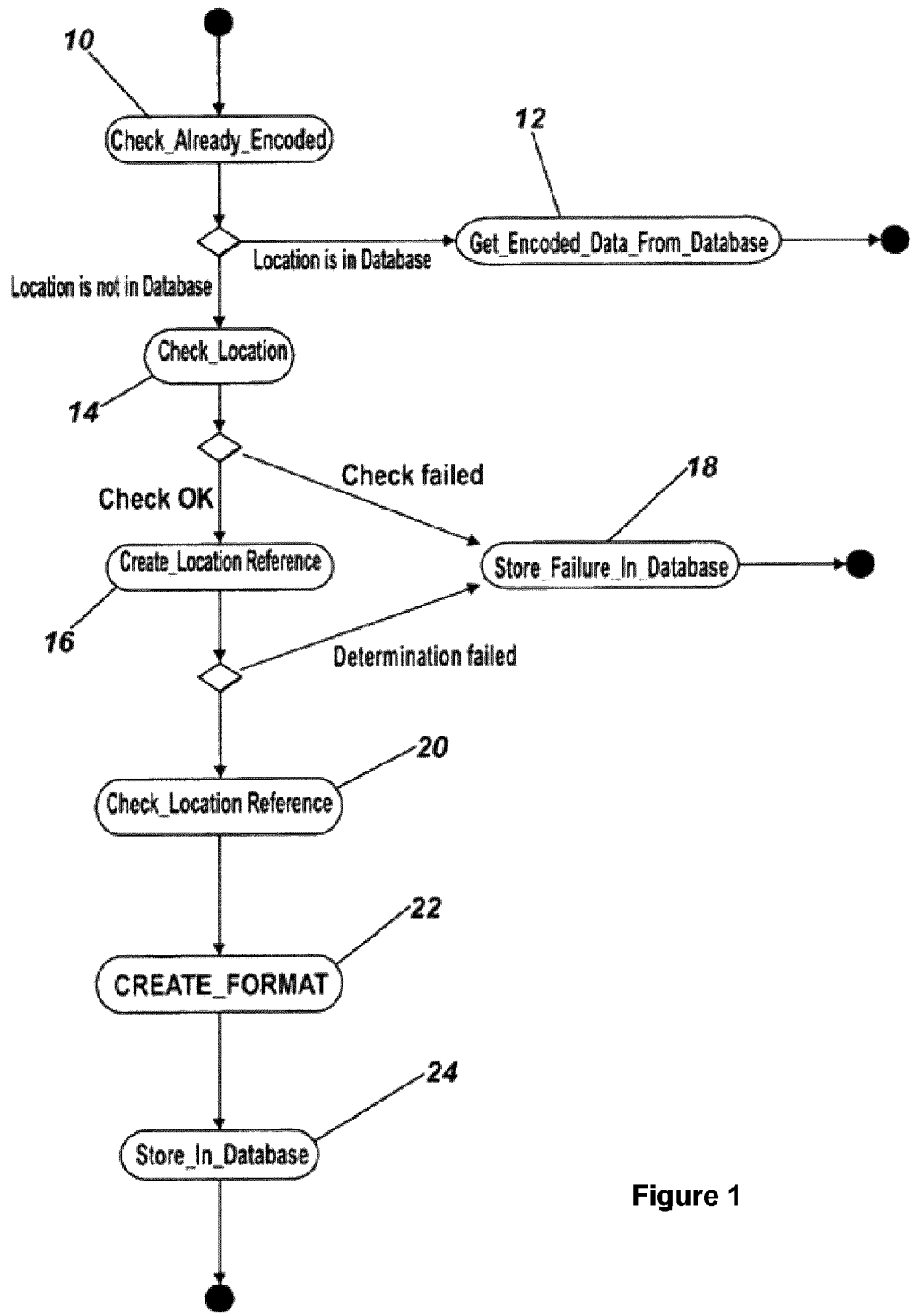
FIG. 1 shows an overview schematic flowchart of the encoding method.
Figure 2:
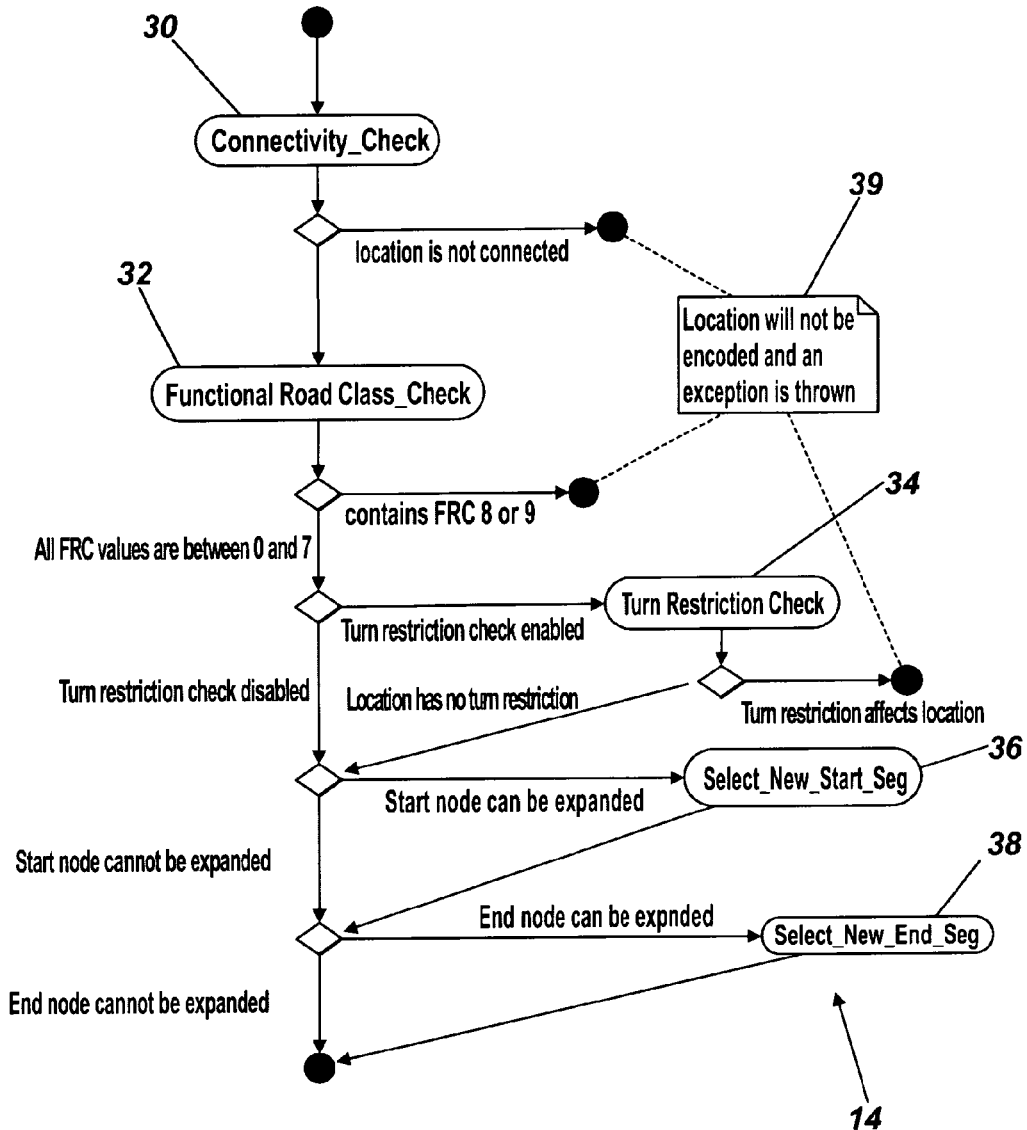
FIG. 2 shows a schematic flowchart of the validity check first performed as part of the encoding method.
Figure 3:
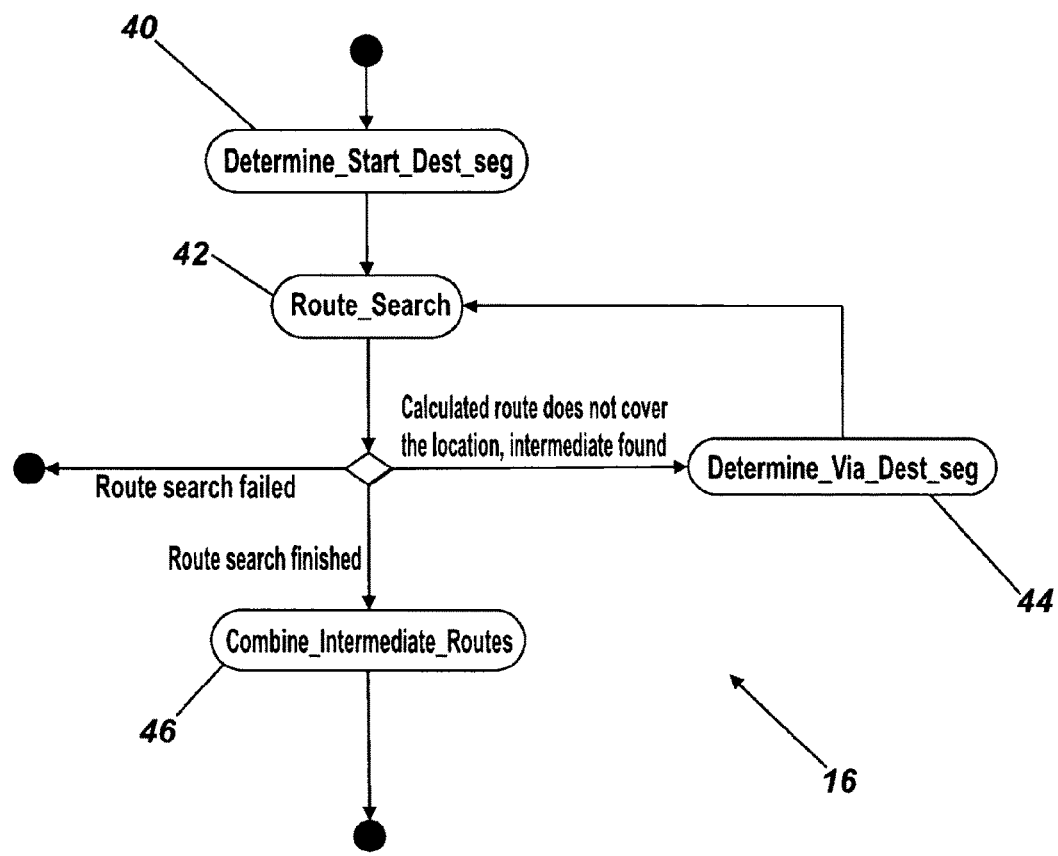
FIG. 3 shows a schematic flowchart of the iterative part of the encoding method including a shortest path route search function.
Figure 4:
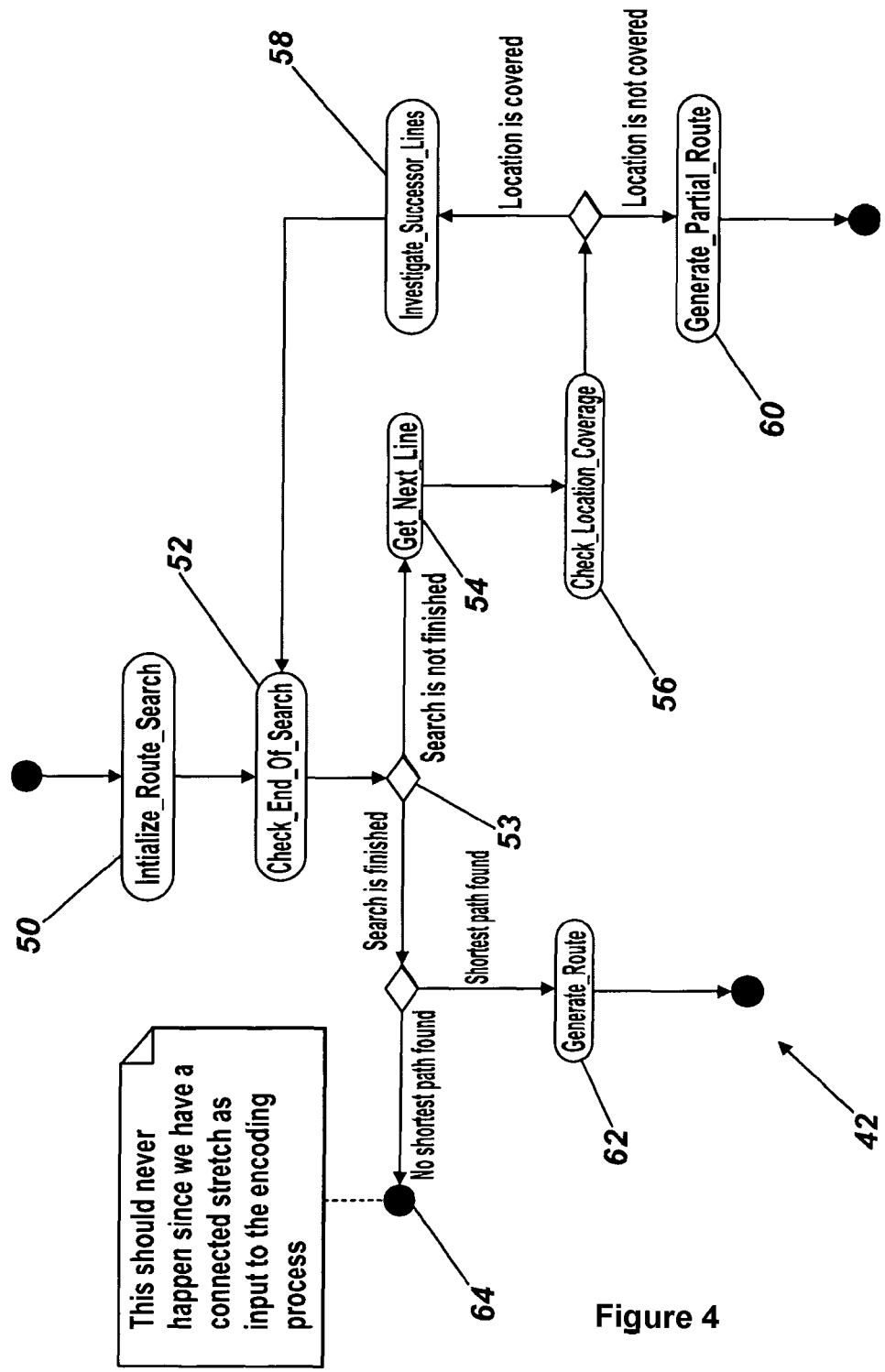
FIG. 4 shows a schematic flowchart of the shortest path route search function in greater detail.
Figure 5:
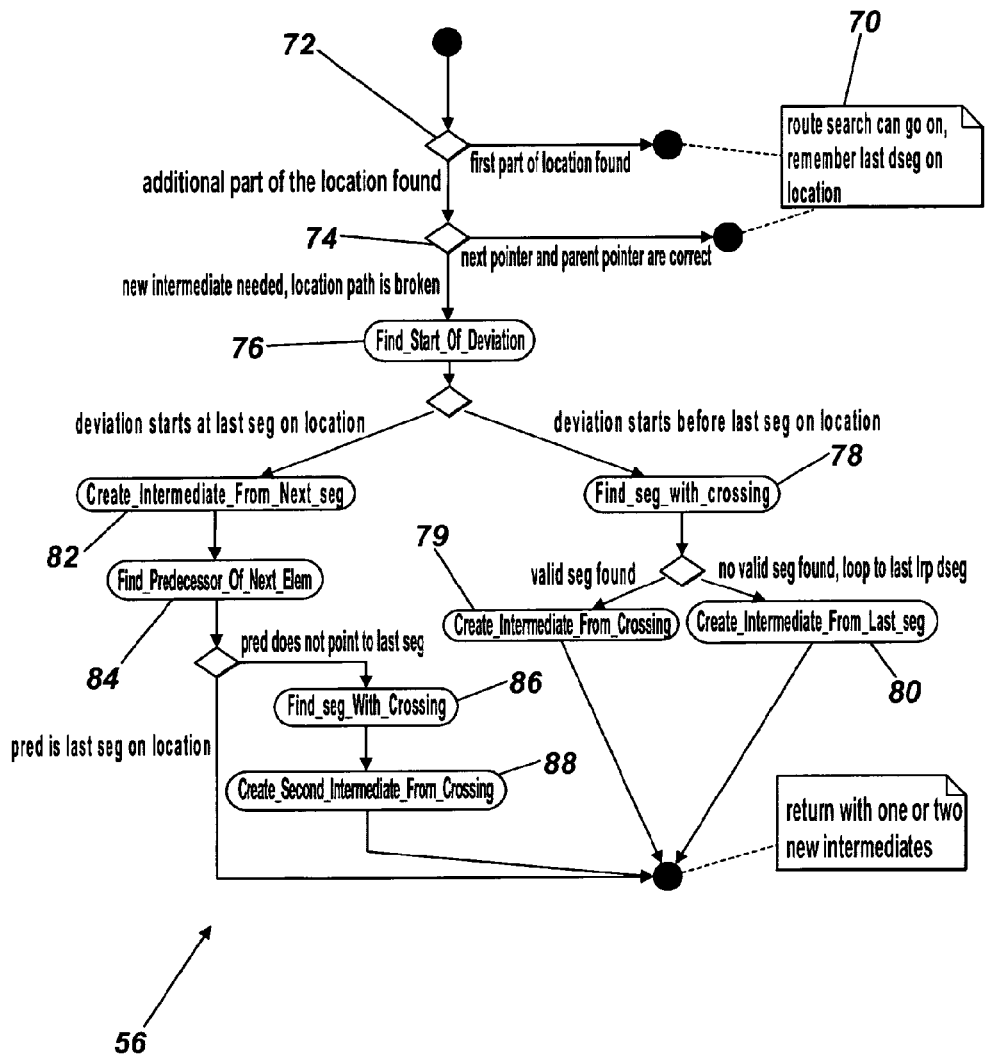
FIG. 5 shows a schematic flowchart of the procedure involved in determining that whether the location desired to be encoded is being correctly covered by the shortest path route search.
Figure 6:
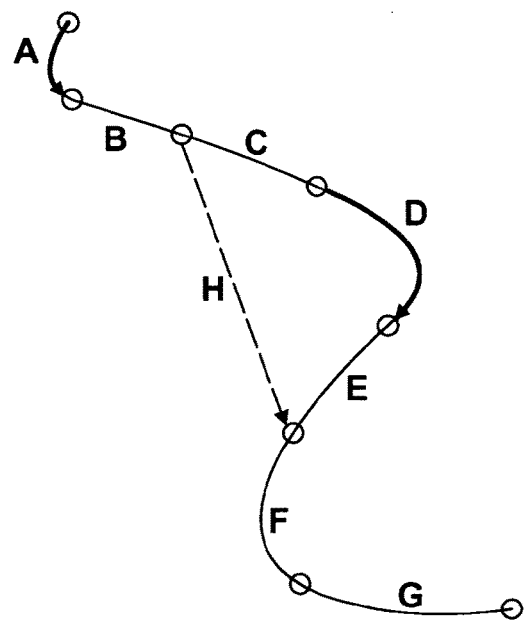
FIGS. 6, 7 and 8 graphically illustrate the different possibilities occurring in checking that a location is being correctly covered by the procedure illustrated in FIG. 5.
Figure 7:
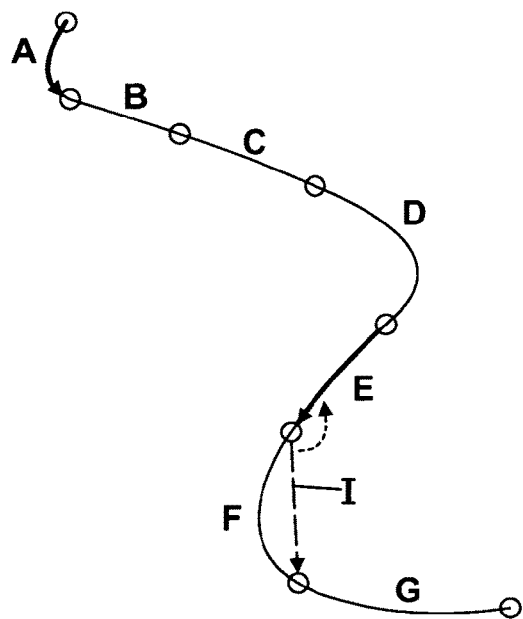
Figure 8:
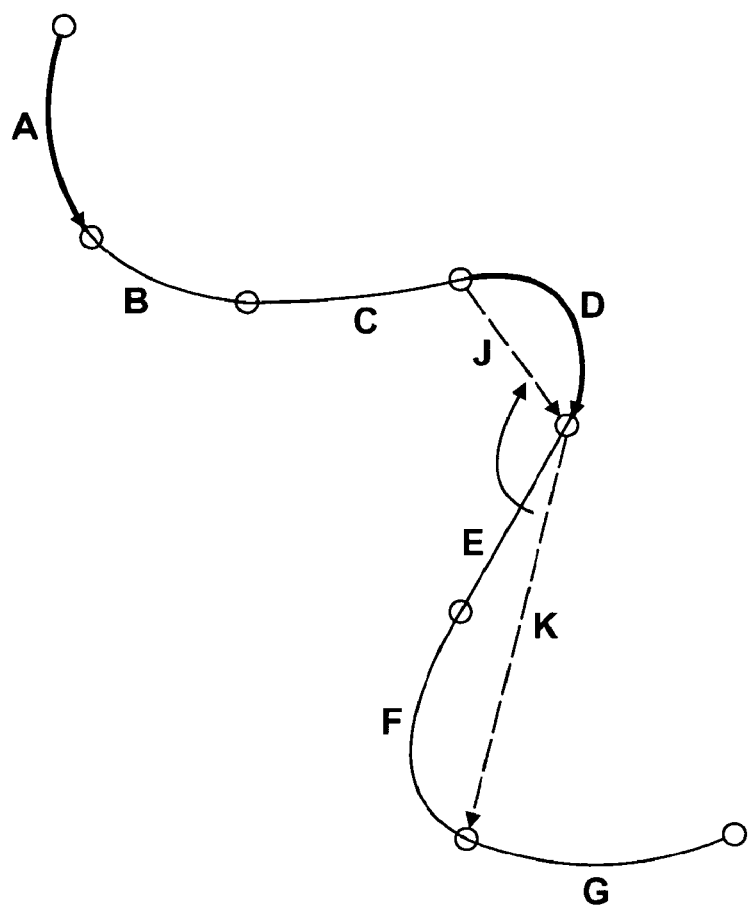
Figure 9:
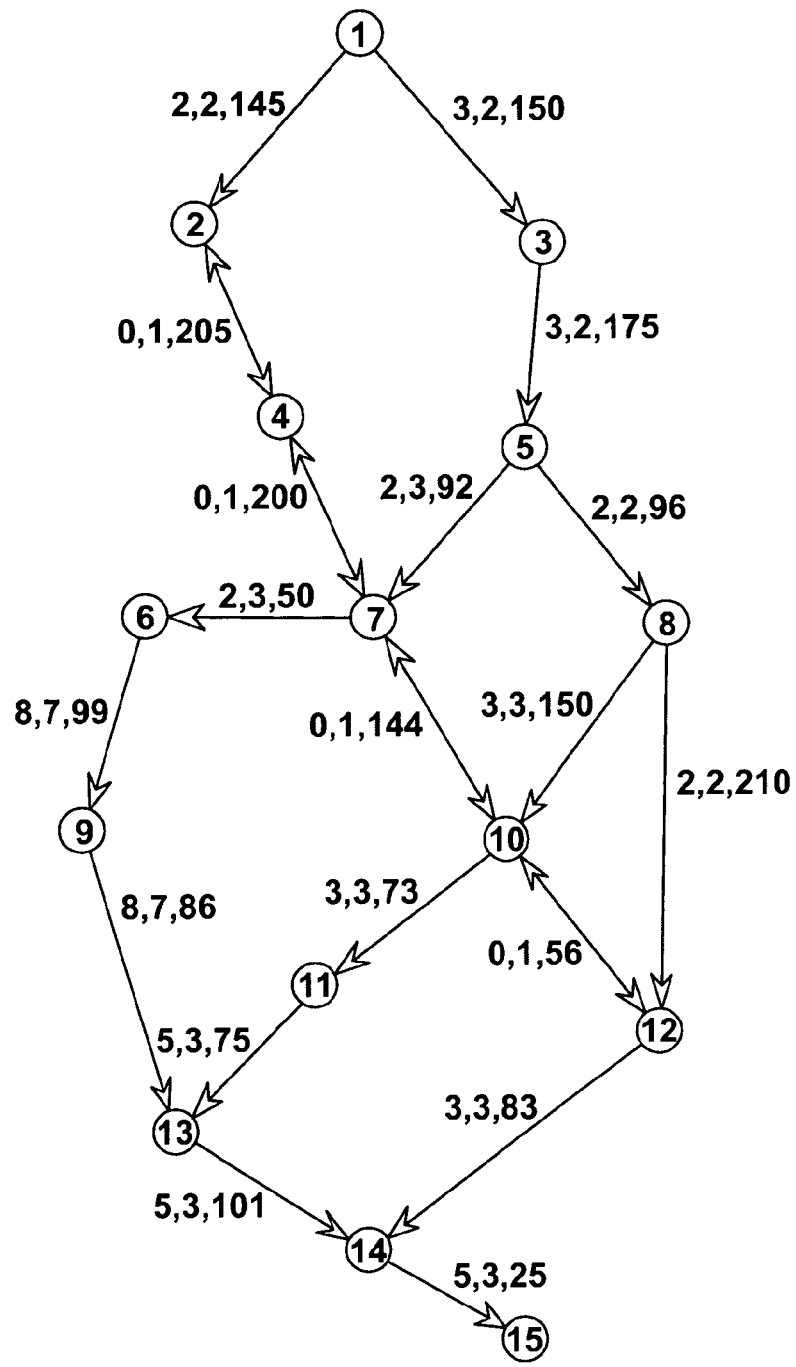
FIGS. 9, 10, 11, and 12 provide schematic representations of a digital map including nodes and segments and in particular
Figure 10:
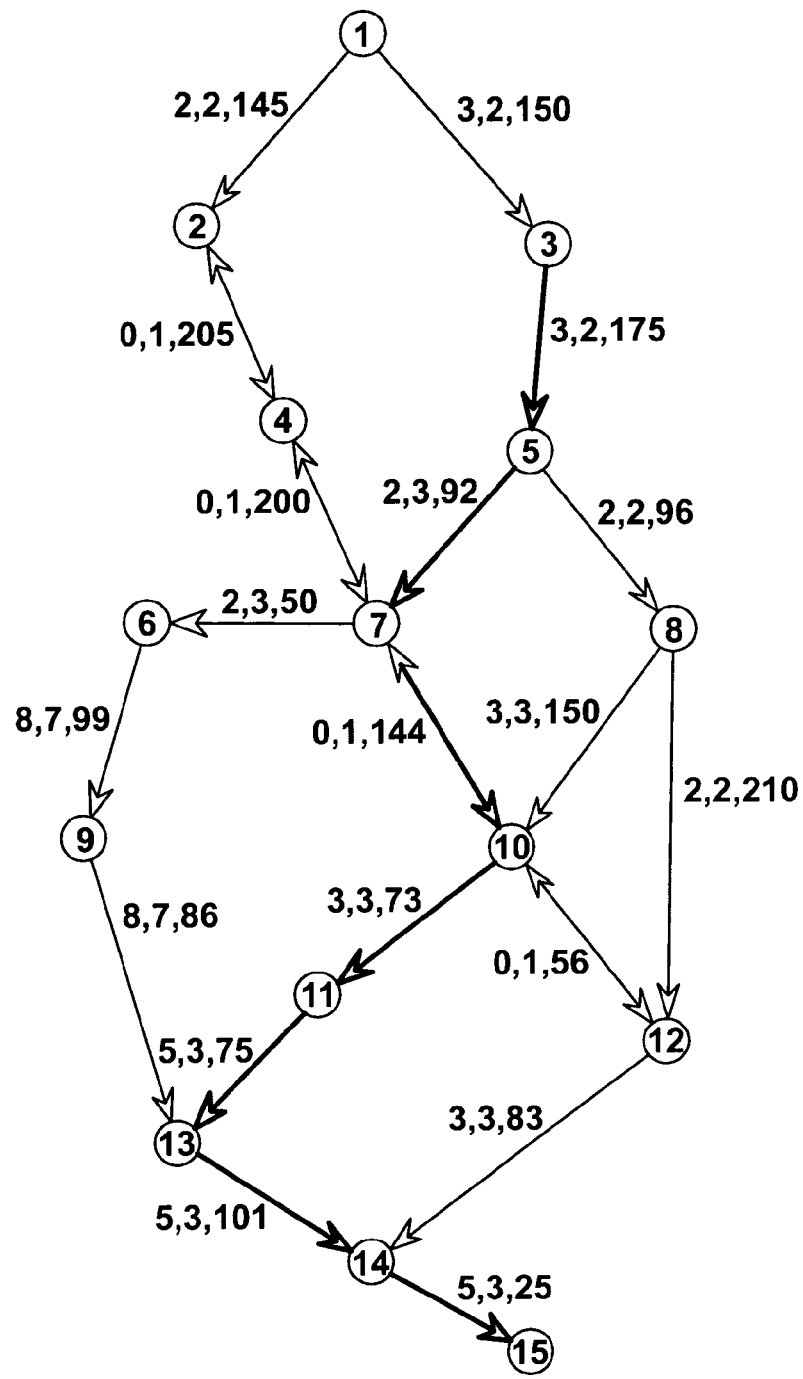
Figure 11:
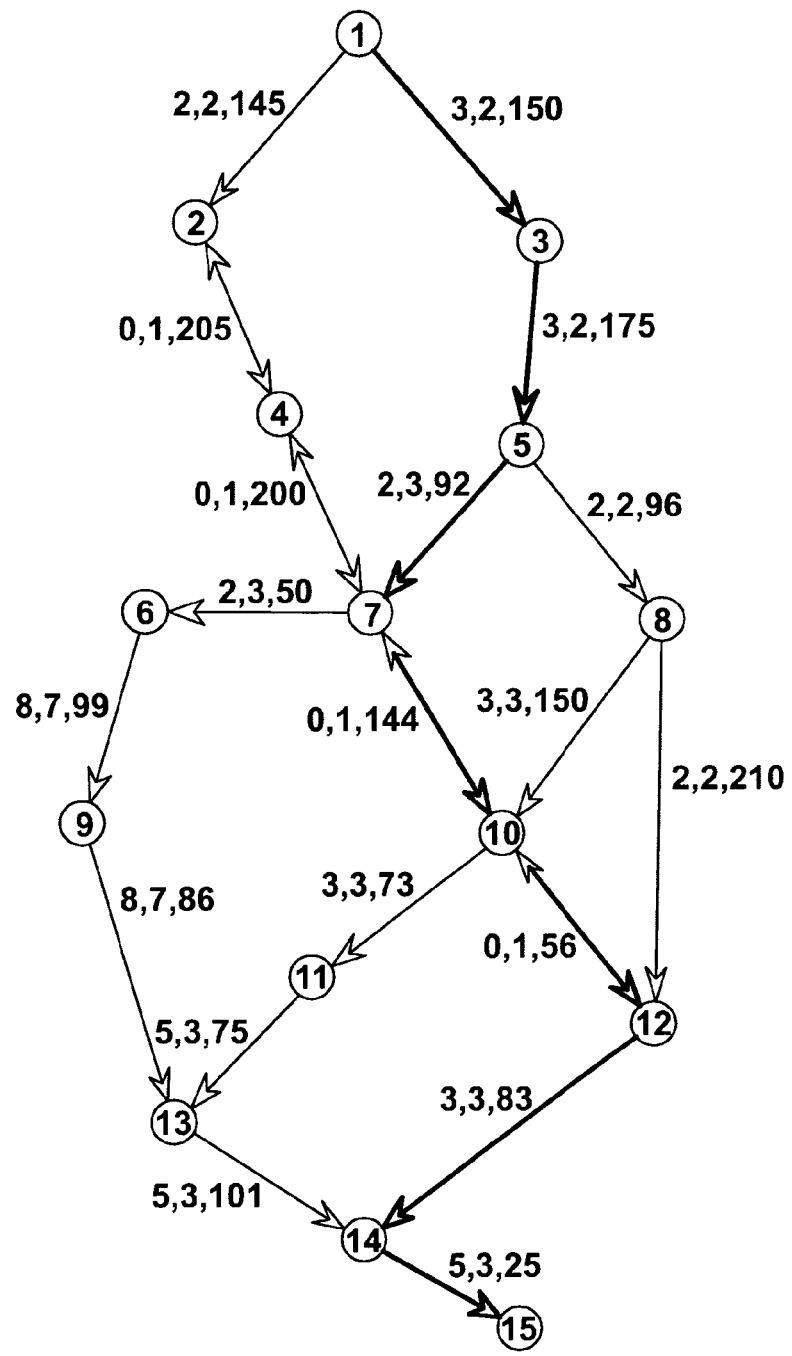
Figure 12:
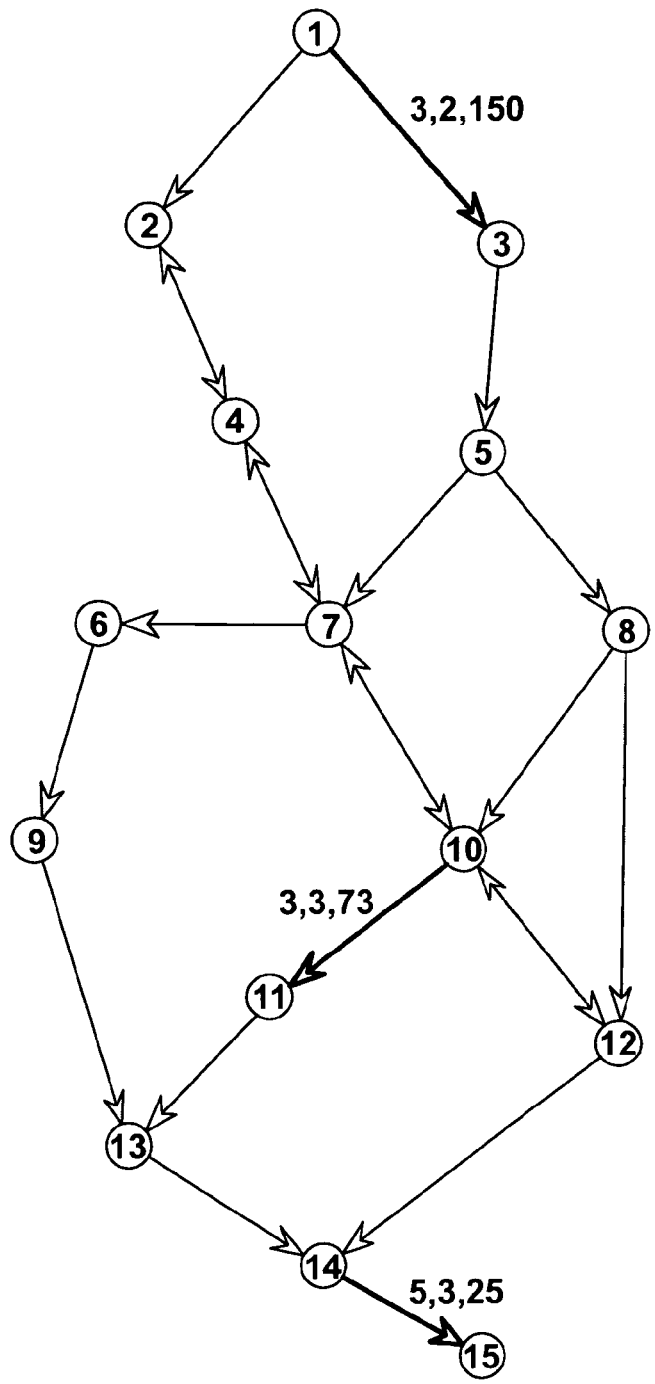

The following description of the invention is provided in terms of segments, but it is to be understood that the method can be applied equally to lines, or to combinations of lines and segments which together are representative of a continuous path through a road network.

The implementation of the OpenLR encoder as described in WO 2010/000707 makes use of a goal-directed unidirectional search (A*) in order to determine the shortest path coverage of a line location. The directedness of the search already reduces the number of lines which need to be investigated. However, by using the LFRC value during route search it is possible to further reduce the number of relevant lines. Several ways of finding LFRC values either time or space efficiently are described below.

Encoder Route Search

The encoder tries to cover a line location with an ordered sequence of shortest paths along the line location path. A shortest path route search from the start to the end of the line location is performed. If the shortest path from start to end is not described by the line location itself, an intermediate line is determined which is part of the location and follows directly after aberration of shortest path and line location. Such an intermediate line serves as the start line for the next route search run to the end of the line location. This iterative process is continued until all lines are part of shortest paths.

The Use of an LFRC Attribute in the Route Search

The manner in which LFRC values can be utilized in order to reduce the number of lines which need to be investigated during route search will now be described. It will be appreciated that the invention will be described by reference to this preferred embodiment in which the attribute of the lines or segments used by the algorithm in the route search is an LFRC value. However, the invention is not limited to the use of LFRC values as the attribute.

The route search finds the shortest path coverage of the line location. Each such shortest path covers a certain part of the line location. For each such location part an LFRC value can be calculated. As the distribution of shortest paths along the line location is a priori not known strategies need to be defined to determine valid LFRC values before the route search starts. Several ways for finding valid LFRC values are possible and are presented below. The LFRC values are applied in route search such that no line with a lower FRC value than the current LFRC value is considered for routing as by definition of LFRC calculation no line in the remaining part of the line location has a lower FRC value.

1. Determine LFRC for the Entire Line Location

The LFRC of the entire line location is also the LFRC of any part of the line location. Hence, using such LFRC is a valid heuristic for all route search runs. This value is calculated only once before the first route search run by iterating over the entire line location.

2. Determine LFRC Only for Remaining Part of the Line Location

The LFRC of the remaining line location which is not yet covered by a sequence of shortest paths is greater than or equal to the LFRC for the entire line location, i.e. it refers to lines of higher or equal importance. This tighter LFRC value can be calculated in three different ways:

Naïve LFRC calculation: Before the first route search run iterate over the entire remaining part of the line location and determine its LFRC value.

LFRC tree: Before the first route search build up an interval tree which provides the LFRC values for sub locations of the line location. An example is given in FIG. 13. The leaves of the interval tree correspond to the lines of the line location ordered from left to the right as they appear in the line location. In each node of the tree the lowest FRC (i.e. the highest number) value of any leaf spanned by the sub-tree is written together with the leaf interval which is covered by the sub-tree. The relevant LFRC for a given remaining part of the line location can be determined by traversing the tree from the leaf which forms the start in the next route search run towards the root of the tree. The traversal stops as soon as the interval field of a node covers the sub-location from the current start node to the end node. The LFRC calculation for a concrete sub-location proceeds as follows:

1. Start at the left most leaf which corresponds to the start of the sub-location to be covered and assign it to some variable CUR_NODE. Initialize some variable CUR_LFRC with the FRC value of CUR_NODE.
2. Check if the interval in CUR_NODE covers the sub-location completely:
2.i. If so then the LFRC for the sub-location is CUR_LFRC and the calculation is finished.
2.ii. Otherwise continue with 3.
3. Calculate CUR_LFRC:
3.i. If CUR_NODE is the left child of its parent node then determine the lowest FRC between CUR_LFRC and the FRC value of the left child of CUR_NODE's parent node and save it to CUR_LFRC.
3.ii. If CUR_NODE is the right child of its parent node then CUR_LFRC remains the same.
4. Set CUR_NODE to the parent node of the current CUR_NODE. Continue with step 2.

Figure 13:
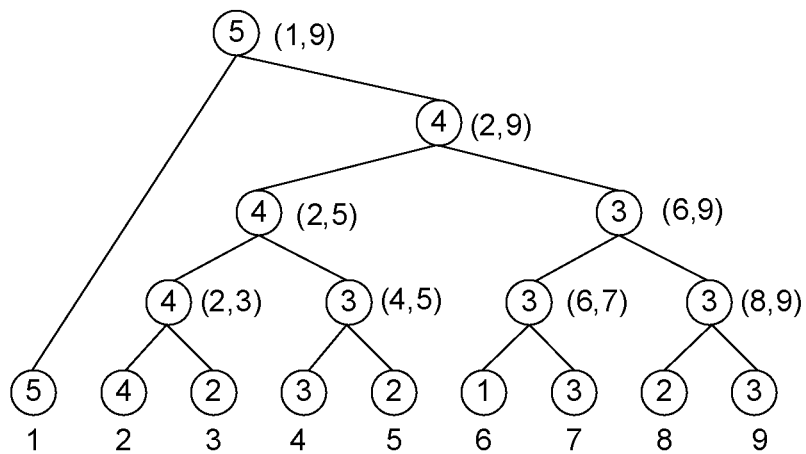
FIGS. 13 to 18 illustrate an exemplary LFRC interval tree, and the associated method used to determine the LFRC of the remaining line location.

The above described algorithm is demonstrated for the sub-location which starts at position 5 (as shown in FIG. 13). CUR_NODE is grey-shaded and identified by its interval.

Figure 14:
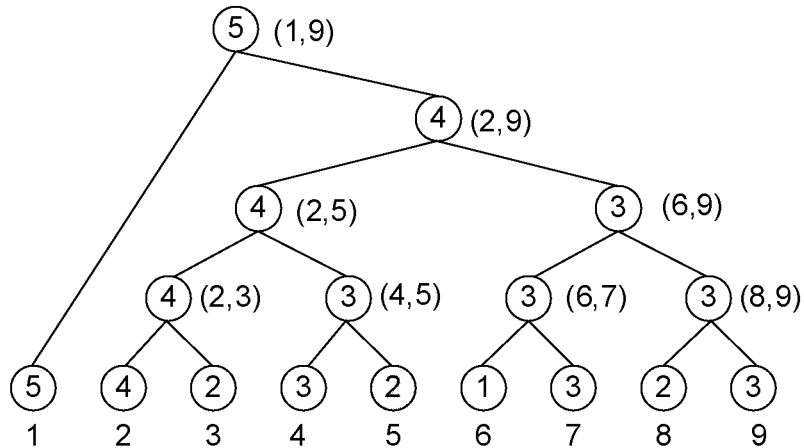

FIG. 14 shows the initialisation, wherein CUR_NODE=5, CUR_LFRC=2.

Figure 15:
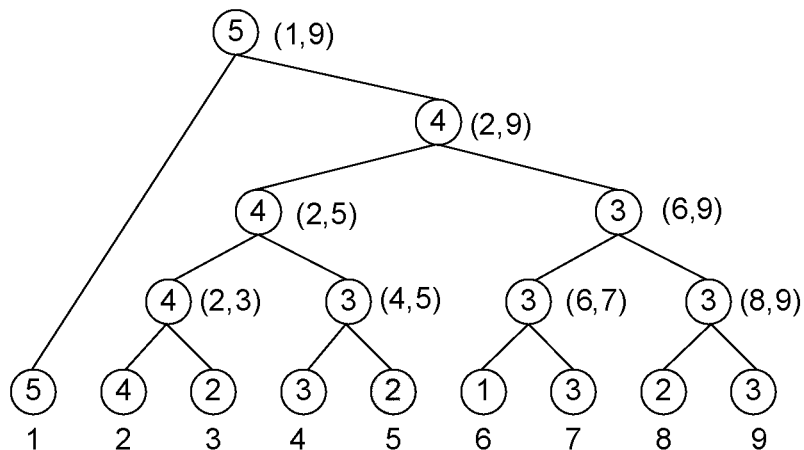

FIG. 15 shows the first up-step, wherein initially CUR_NODE=5. According to 3.ii. CUR_LFRC remains 2, and CUR_NODE is set to (4,5).

Figure 16:
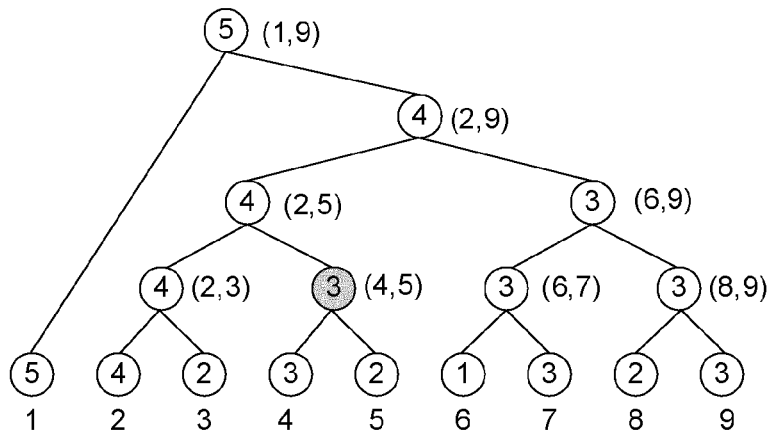

FIG. 16 shows the second up-step, wherein initially CUR_NODE=(4,5). According to 3.ii. CUR_LFRC remains 2, and CUR_NODE is set to (2,5).

Figure 17:
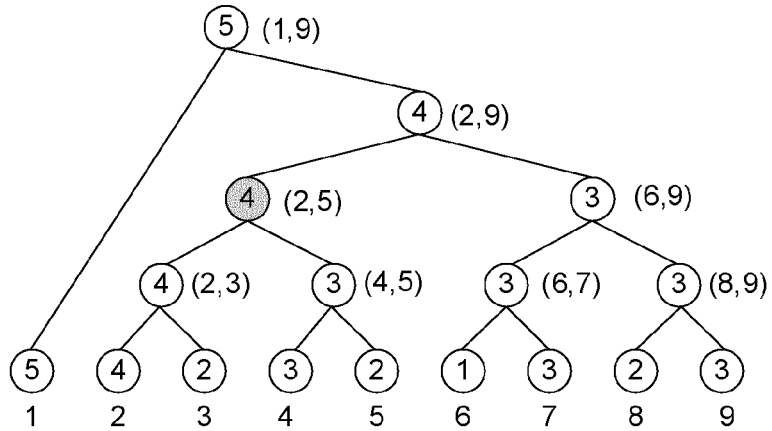

FIG. 17 shows the third up-step, wherein initially CUR_NODE=(2,5). According to 3.i. CUR_LFRC becomes 3, and CUR_NODE is set to (2,9).

Figure 18:
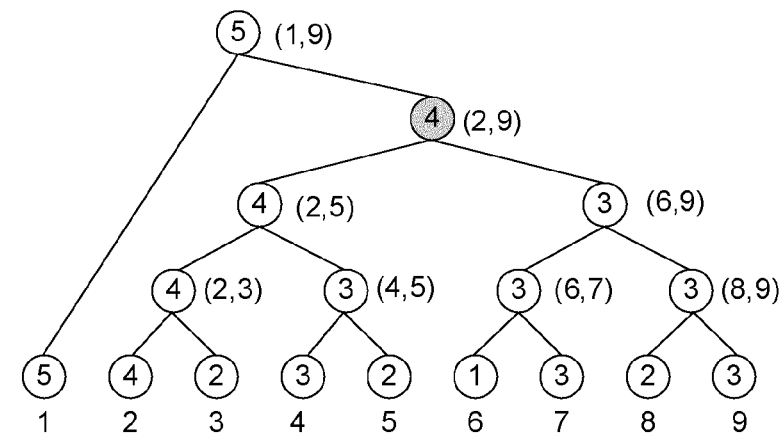

FIG. 18 shows the situation after the traversal has finished according to 2, and wherein LFRC for (5,9) is 3.

LFRC array: The number of FRC values is restricted to 8 types (FRC 0 to FRC 7). As a consequence, when iterating over a line location starting at the last and ending at the first line the FRC value can only be decreased at most 7 times. This knowledge can be used to compute an array which provides LFRC information for any suffix of the line location. The array is composed of at most 8 value pairs. Each such pair stores a line index and an FRC value. The line index corresponds to the start of the longest suffix of the line location which has an LFRC as stored in the FRC field of the pair. The array is constructed as follows:

1. Initialization:
   Create an empty array LFRC_ARRAY which shall store the value pairs.
   Create a value pair CUR_PAIR which has two fields:
      CUR_PAIR.IDX is set to the index of the last line in the line location and CUR_PAIR.LFRC is set to the FRC of the last line of the line location.
   Set some integer CUR_IDX to the CUR_PAIR.IDX.
   Create a variable CUR_FRC and set it to CUR_PAIR.LFRC
2. Set CUR_FRC to the FRC value of line location at position CUR_IDX
3. Compare FRC values:
   If CUR_FRC is lower than CUR_PAIR.LFRC then append CUR_PAIR to LFRC_ARRAY. Create a new pair value and set the IDX field to CUR_IDX and the LFRC field to CUR_FRC and assign it to CUR_PAIR.
   Otherwise set field CUR_PAIR.IDX to CUR_IDX.
4. Decrement CUR_IDX by 1.
   If CUR_IDX equals 0 then stop.
   Otherwise continue with step 2.

The LFRC_ARRAY to the line location given by the leaves of the trees in FIG. 13 looks as follows: (IDX: 3, LFRC: FRC 3), (IDX: 2, LFRC: FRC 4), (IDX: 1, LFRC: FRC 5). This means that all sub-locations starting at a position greater or equal to 3 have an LFRC of FRC 3. The longest sub-location which is the entire location has an LFRC of FRC 5 and the second longest sub-location starting at position 2 has an LFRC of FRC 4.

Overcome Map Differences

In order to overcome possible differences between the maps of the system running the encoder and the system running a corresponding decoder, the encoder route search is, at least in some embodiments, not parameterized with the actual determined LFRC value but some softened value with a lower FRC, e.g. the calculated LFRC for some sub-location of the line location is FRC 3, a possible softened LFRC would then be FRC 5. Using FRC 5 would consider more lines for routing as also lines with FRC 4 and FRC 5 would be considered. An example of such softening is presented below (and is shown in FIGS. 19 and 20):

Imagine there is a short cut for some part of the line location in the map used by the encoder and this short cut is not part of the actual line location. Assume this short cut has an LFRC of FRC 4. The calculated LFRC on the line location, however, is FRC 3. Now assume the encoder would not use a softened LFRC—which in turn means that it would never detect this short-cut. Furthermore, imagine the decoder uses the same map as the encoder and the decoder applies a similar LFRC softening. As the decoder applies a softening to the LFRC value, then it would find the aforementioned short cut as it considers lines with FRC 4 and FRC 5. These lines are, however, omitted during the encoder route search. Hence, using a softened LFRC for encoder route search is necessary if the decoder also applies such softening.

Figure 19:
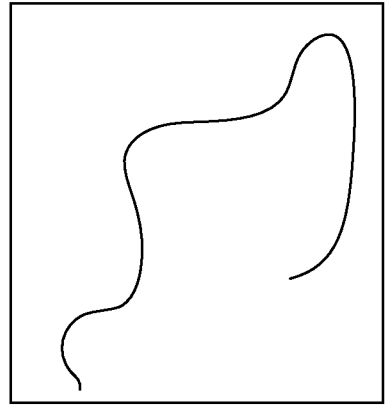
FIGS. 19 and 20 illustrate the use of a softened LFRC value.
Figure 19:
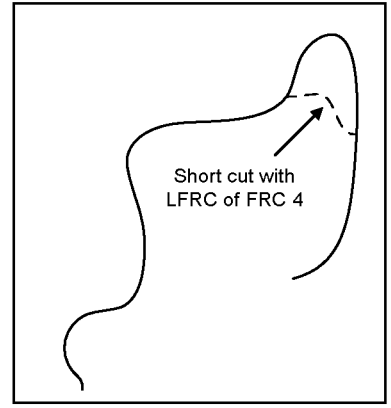
Figure 20:
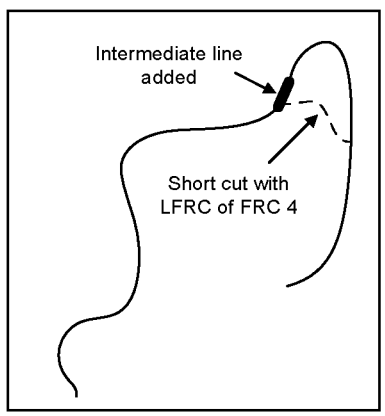
Figure 20:
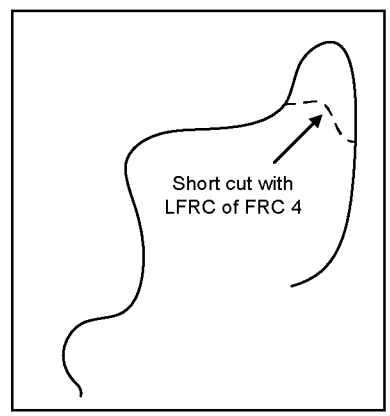

In FIG. 19, the encoder does not use a softened LFRC value, and thus the decoder finds the incorrect line location which contains the short cut. In FIG. 20, the encoder uses a softened LFRC value, and the decoder therefore finds the correct line location as the encoder inserts an intermediate line due to the detected short cut.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

The invention claimed is:

1. A method of encoding a continuous path within a road network, said path being completely represented within a digital map and expressible as a path list of lines and/or segments existing in said digital map and consecutively ordered, wherein said lines and/or segments have one or more attributes associated therewith including a functional road class (FRC), said method comprising the steps of:
   determining a lowest functional road class (LFRC) for the lines and/or segments forming at least a portion of the continuous path to be encoded;
   storing a start position in a route search list;
   determining a path from the start position to an end position as indicated by the last line or segment in the path list within said digital map, said path being determined according to an algorithm, said algorithm using the determined LFRC to provide a threshold, and to not consider those lines and/or segments for inclusion in the path being determined that have a lower FRC attribute than the threshold;
   encoding the continuous path using the determined path; and
   storing the encoded continuous path.

2. The method of claim 1, wherein the threshold is the determined lowest functional road class (LFRC) or is a softened LFRC value that is higher than the determined LFRC.

3. The method of claim 1, comprising determining a path from a start node of the start position and including the start position to an end node of the last line or segment in the path list within the digital map.

4. The method of claim 1, wherein the step of determining a path from the start position to an end position comprises determining a shortest path from the start position to the end position as indicated by the last line or segment in the path list within the digital map.

5. The method of claim 4, comprising calculating an associated LRFC value for the or each shortest path that is determined.

6. The method of claim 4, comprising determining an LFRC value for an entire line location corresponding to the continuous path to be encoded.

7. The method of claim 4, wherein a separate LFRC value is determined for each portion of the path to be encoded for which a shortest path is calculated.

8. The method of claim 1, wherein said step of determining the path from the start position to the end position comprises finding a shortest path coverage of the continuous path.

9. The method of claim 1, wherein the algorithm is a shortest path algorithm.

10. The method of claim 1, wherein said start position is one of:
- the line or segment first appearing in said path list or, where the start node of said first line or segment is artificial, the first line or segment appearing in said digital map having a real start node and which leads directly to said first line or segment optionally through other artificial nodes,
- a most recently identified deviation line or segment also appearing in said path list.

11. The method of claim 1, comprising comparing a shortest path determined from a start node of the start position to an end node of the last line or segment in the path list within the digital map to the path list for identity, and in the absence of identity, identifying at least one deviation line or segment being part of the path list and having a start node representative of an intersection in said digital map but not being the line or segment first appearing in said path list, and if such deviation line or segment does not terminate at the end node of the last line or segment appearing in the path list, repeating the step of storing a start position using said deviation line or segment, and storing the last line or segment in the path list in said route search list if not already stored.

12. The method of claim 1, comprising the steps of:
(i) storing a start position in a route search list, said start position being one of:
- the line or segment first appearing in said path list or, where the start node of said first line or segment is artificial, the first line or segment appearing in said digital map having a real start node and which leads directly to said first line or segment optionally through other artificial nodes,
- a most recently identified deviation line or segment also appearing in said path list, and wherein the algorithm is a shortest path algorithm, the method further comprising the steps of:
(ii) determining a path from the start node of the start position and including said start position to an end node of the last line or segment in the path list within said digital map, said path being determined according to a shortest path algorithm, said algorithm using the determined LFRC to provide a threshold, and to not consider those lines and/or segments for inclusion in the path being determined that have a lower FRC attribute than the threshold
(iii) comparing the shortest path so determined to the path list for identity, and in the absence of identity, identifying at least one deviation line or segment being part of the path list and having a start node representative of an intersection in said digital map but not being the line or segment first appearing in said path list, and if such deviation line or segment does not terminate at the end node of the last line or segment appearing in the path list, repeating step (i) using said deviation line or segment, and
(iv) storing the last line or segment in the path list in said route search list if not already stored.

13. The method of claim 1, further comprising provisioning services on a navigation device based on the stored digital map.

14. An encoder comprising at least one processor arranged to encode a continuous path within a road network, said path being completely represented within a digital map and expressible as a path list of lines and/or segments existing in said digital map and consecutively ordered, wherein said lines and/or segments have one or more attributes associated therewith including a functional road class (FRC), said encoding comprising the steps of:
- determining a lowest functional road class (LFRC) for the lines and/or segments forming at least a portion of the continuous path to be encoded;
- storing a start position in a route search list;
- determining a path from the start position to an end position as indicated by the last line or segment in the path list within said digital map, said path being determined according to an algorithm, said algorithm using the determined LFRC to provide a threshold, and to not consider those lines and/or segments for inclusion in the path being determined that have a lower FRC attribute than the threshold;
- encoding the continuous path using the determined path; and
- storing the encoded continuous path.

15. A navigation device comprising the encoder of claim 14.

16. The encoder of claim 14, wherein the step of determining a path from the start position to an end position comprises determining a shortest path from the start position to the end position as indicated by the last line or segment in the path list within the digital map.

* * * * *